US010332480B2

(12) United States Patent
Wang et al.

(10) Patent No.: US 10,332,480 B2
(45) Date of Patent: Jun. 25, 2019

(54) COLOR DISPLAY METHOD AND SYSTEM FOR MOBILE TERMINAL

(71) Applicant: HuiZhou TCL Mobile Communication Co., Ltd., HuiZhou (CN)

(72) Inventors: Rui Wang, HuiZhou (CN); Xiaoqing Wang, HuiZhou (CN)

(73) Assignee: HuiZhou TCL Mobile Communication Co., HuiZhou (CN)

( * ) Notice: Subject to any disclaimer, the term of this patent is extended or adjusted under 35 U.S.C. 154(b) by 231 days.

(21) Appl. No.: 15/318,978

(22) PCT Filed: Apr. 7, 2016

(86) PCT No.: PCT/CN2016/078647
§ 371 (c)(1),
(2) Date: Dec. 15, 2016

(87) PCT Pub. No.: WO2017/028544
PCT Pub. Date: Feb. 23, 2017

(65) Prior Publication Data
US 2017/0256235 A1 Sep. 7, 2017

(30) Foreign Application Priority Data
Aug. 17, 2015 (CN) .......................... 2015 1 0503535

(51) Int. Cl.
*H04N 1/60* (2006.01)
*H04N 9/64* (2006.01)
(Continued)

(52) U.S. Cl.
CPC ............. *G09G 5/06* (2013.01); *G09G 3/2003* (2013.01); *G09G 5/02* (2013.01);
(Continued)

(58) Field of Classification Search
CPC .. G09G 3/2003; G09G 5/06; G09G 2360/144; H04N 1/6088; H04N 5/58; H04N 21/41407; H04N 21/42202
See application file for complete search history.

(56) References Cited

U.S. PATENT DOCUMENTS 9,123,277 B2 9/2015 Kim et al.
2007/0139405 A1* 6/2007 Marcinkiewicz .... G09G 3/2003 345/207
(Continued)

FOREIGN PATENT DOCUMENTS

CN 101404148 4/2009
CN 101930723 12/2010
(Continued)

*Primary Examiner* — Ke Xiao
*Assistant Examiner* — Andrew Shin

(57) ABSTRACT

The present invention discloses a color display method and system for a mobile terminal. According to the method, an environmental ambient light level for a mobile terminal is detected, a color enhancement factor is calculated according to the ambient light level, and display color of the mobile terminal is enhanced according to the color enhancement factor. A color enhancement technology widely used in a display screen is combined with the environmental ambient light level. The color enhancement is dynamically adjusted according to the intensity of ambient light.

8 Claims, 2 Drawing Sheets

(51) Int. Cl.
*G06T 7/90* (2017.01)
*G09G 5/06* (2006.01)
*G09G 5/02* (2006.01)
*G09G 3/20* (2006.01)

(52) U.S. Cl.
CPC ............... *G09G 2320/0242* (2013.01); *G09G 2320/0666* (2013.01); *G09G 2330/021* (2013.01); *G09G 2340/06* (2013.01); *G09G 2360/144* (2013.01)

(56) References Cited

U.S. PATENT DOCUMENTS

| | | | | |
|---|---|---|---|---|
| 2014/0071102 | A1 | 3/2014 | Pieper et al. | |
| 2014/0210802 | A1 | 7/2014 | Myers et al. | |
| 2015/0277840 | A1 * | 10/2015 | Ninan | G06F 3/1423 345/589 |

FOREIGN PATENT DOCUMENTS

| | | |
|---|---|---|
| CN | 104376834 | 2/2015 |
| CN | 105070269 | 11/2015 |

* cited by examiner

COLOR DISPLAY METHOD AND SYSTEM FOR MOBILE TERMINAL

RELATED APPLICATIONS

This application is a National Phase of PCT Patent Application No. PCT/CN2016/078647 having International filing date of Apr. 7, 2016, which claims the benefit of priority of Chinese Patent Application No. 201510503535.5 filed on Aug. 17, 2015. The contents of the above applications are all incorporated by reference as if fully set forth herein in their entirety.

FIELD AND BACKGROUND OF THE INVENTION

The present invention relates to a mobile terminal display technology, and more particularly to a color display method and system for a mobile terminal.

As mobile terminals (e.g., a cell phone, a tablet computer, and a wearable apparatus) are developed and widely used, people cannot live without these electronic products in their daily lives. The cell phone is everyone's standard equipment and most own several mobile terminals including the cell phone. Every mobile terminal is generally equipped with a display screen. Good outdoor visibility for the display screen is always a direction that display technology is pursuing.

Restricted to the technical ability and power consumption of the mobile terminal, current mobile terminals exhibit poor display under strong outdoor light. This is because intensity of ambient light reflected by the screen itself is too high. The reflected ambient light mixes with an image on the display screen and dilutes display color, thereby reducing color contrast. The mobile terminals, such as cell phones, are frequently used under strong outdoor light. The screen itself has a problem of mirror reflection. Currently, better designs still lead to an approximately 5% reflection. If a user is in an environment under an ambient light intensity of 100 thousand lux, the screen brightness of reflected light may reach several hundred nits. However, the brightness of the display screen is several hundred nits at most. The light coming from an image and the reflected light are mixed up. This seriously degrades color performance and contrast of the image and leads to decreasing in display quality such that it is hard for the user to clearly see the screen.

Therefore, there is a need to further develop and improve the existing skills.

SUMMARY OF THE INVENTION

The technical problem to be solved in the present invention is to provide a color display method and system for a mobile terminal for solving the problems of a poor outdoor display effect and bad color performance in an existing mobile terminal.

The technical schemes of the present invention adopted to solve the technical problems are described below.

A color display method for a mobile terminal, comprising: detecting an environmental ambient light level for a mobile terminal; comparing the environmental ambient light level (L) with a first environmental ambient light level (L0), which is preset, to get a comparison result; calculating a color enhancement factor according to the comparison result; enhancing display color of the mobile terminal according to the color enhancement factor; detecting whether a maximum color gamut is operating on a display screen of the mobile terminal; calculating a to-be-operated color gamut for the display screen of the mobile terminal according to the environmental ambient light level and a color gamut mode currently operating on the display screen of the mobile terminal when the maximum color gamut is not operating on the display screen of the mobile terminal; and adjusting a color gamut operating on the display screen of the mobile terminal according to the obtained to-be-operated color gamut of the display screen of the mobile terminal.

In the color display method for the mobile terminal, the step of calculating the color enhancement factor according to the comparison result comprises: setting the color enhancement factor (a) as a first color enhancement factor (a0), which is preset, when L<L0; and setting the color enhancement factor (a) as Min [a0+(L−L0)/Lmax, 1] when L≥L0, where Lmax is an environmental ambient light level leading to a maximum of color enhancement.

In the color display method for the mobile terminal, the step of calculating the to-be-operated color gamut for the display screen of the mobile terminal according to the environmental ambient light level and the color gamut mode currently operating on the display screen of the mobile terminal comprises: calculating a color gamut factor for the display screen of the mobile terminal according to the comparison result; and calculating the to-be-operated color gamut of the display screen of the mobile terminal according to the color gamut factor.

In the color display method for the mobile terminal, the step of calculating the color gamut factor for the display screen of the mobile terminal according to the comparison result comprises: setting the color gamut factor (b) as zero when L<L0; and setting the color gamut factor (b) as Min [(L−L0)/Lmax, 1] when L≥L0, where L0 is the first environmental ambient light level, and Lmax is an environmental ambient light level leading to a maximum of color enhancement.

In the color display method for the mobile terminal, the step of calculating the to-be-operated color gamut of the display screen of the mobile terminal according to the color gamut factor comprises: setting the to-be-operated color gamut (S) of the display screen of the mobile terminal as S1+b*(S0−S1), where S0 is a color gamut value corresponding to the maximum color gamut operating on the display screen, and S1 is a color gamut value corresponding to the color gamut mode currently operating on the display screen.

A color display method for a mobile terminal, comprising: detecting an environmental ambient light level for a mobile terminal; calculating a color enhancement factor according to the environmental ambient light level; and enhancing display color of the mobile terminal according to the color enhancement factor.

In the color display method for the mobile terminal, the step of calculating the color enhancement factor according to the environmental ambient light level comprises: comparing the environmental ambient light level (L) to a first environmental ambient light level (L0), which is preset; setting the color enhancement factor (a) as a first color enhancement factor a0, which is preset, when L<L0; and setting the color enhancement factor (a) as Min [a0+(L−L0)/Lmax, 1] when L≥L0, where Lmax is an environmental ambient light level leading to a maximum of color enhancement.

In the color display method for the mobile terminal, after the step of detecting the environmental ambient light level for the mobile terminal, the method further comprises: detecting whether a maximum color gamut is operating on a display screen of the mobile terminal; calculating a to-be-operated color gamut for the display screen of the mobile terminal according to the environmental ambient light level and a color gamut mode currently operating on the display screen of the mobile terminal when the maximum color gamut is not operating on the display screen of the mobile terminal; and adjusting a color gamut operating on the display screen of the mobile terminal according to the obtained to-be-operated color gamut of the display screen of the mobile terminal.

In the color display method for the mobile terminal, the step of calculating the to-be-operated color gamut for the display screen of the mobile terminal according to the environmental ambient light level and the color gamut mode currently operating on the display screen of the mobile terminal comprises: calculating a color gamut factor (b) for the display screen of the mobile terminal according to the environmental ambient light level (L) when the maximum color gamut is not operating on the display screen of the mobile terminal; setting the color gamut factor (b) as zero when $L<L0$; setting the color gamut factor (b) as Min $[(L-L0)/Lmax, 1]$ when $L\geq L0$, where L0 is the first environmental ambient light level, and Lmax is an environmental ambient light level leading to a maximum of color enhancement; and using $S=S1+b*(S0-S1)$ to calculate the to-be-operated color gamut S of the display screen of the mobile terminal, where S0 is a color gamut value corresponding to the maximum color gamut operating on the display screen, and S1 is a color gamut value corresponding to the color gamut mode currently operating on the display screen.

A color display system for a mobile terminal, comprising: a light level detecting module configured to detect an environmental ambient light level for a mobile terminal; a factor obtaining module configured to calculate a color enhancement factor according to the environmental ambient light level; and a color adjusting module configured to enhance display color of the mobile terminal according to the color enhancement factor.

In the color display system for the mobile terminal, the factor obtaining module comprises: a color enhancement factor calculation unit configured to compare the environmental ambient light level (L) to a first environmental ambient light level (L0), which is preset; set the color enhancement factor a as a first color enhancement factor a0, which is preset, when $L<L0$; and set the color enhancement factor a as Min $[a0+(L-L0)/Lmax, 1]$ when $L\geq L0$, where Lmax is an environmental ambient light level leading to a maximum of color enhancement.

In the color display system for the mobile terminal, the factor obtaining module comprises: a color gamut obtaining unit configured to detect whether a maximum color gamut is operating on a display screen of the mobile terminal; and calculate a to-be-operated color gamut for the display screen of the mobile terminal according to the environmental ambient light level and a color gamut mode currently operating on the display screen of the mobile terminal when the maximum color gamut is not operating on the display screen of the mobile terminal.

In the color display system for the mobile terminal, the color gamut obtaining unit comprises: a color gamut factor calculation unit configured to calculate a color gamut factor (b) for the display screen of the mobile terminal according to the environmental ambient light level (L) when the maximum color gamut is not operating on the display screen of the mobile terminal; set the color gamut factor (b) as zero when $L<L0$; and set the color gamut factor b as Min $[(L-L0)/Lmax, 1]$ when $L\geq L0$, where L0 is the first environmental ambient light level, and Lmax is an environmental ambient light level leading to a maximum of color enhancement; and a color gamut calculation unit configured to use $S=S1+b*(S0-S1)$ to calculate the to-be-operated color gamut S of the display screen of the mobile terminal, where S0 is a color gamut value corresponding to the maximum color gamut operating on the display screen, and S1 is a color gamut value corresponding to the color gamut mode currently operating on the display screen.

In the color display system for the mobile terminal, the color adjusting module comprises: a color gamut adjusting unit configured to adjust a color gamut operating on the display screen of the mobile terminal according to the obtained to-be-operated color gamut of the display screen of the mobile terminal.

The present invention provides a color display method and system for a mobile terminal provided, which can for solve the problems of a poor outdoor display effect and bad color performance in existing mobile terminals. In the present invention, an environmental ambient light level for a mobile terminal is detected; a color enhancement factor is calculated according to the environmental ambient light level; and a display color of the mobile terminal is enhanced according to the color enhancement factor. A color enhancement technology widely used in a display screen is combined with the environmental ambient light level. The color enhancement is dynamically adjusted according to the intensity of ambient light. This improves outdoor display effect on the premise that the display effect is assured without significantly increasing power consumption and the display effect under poor indoor illumination is not affected.

This brings a great convenience for the user.

DESCRIPTION OF SPECIFIC EMBODIMENTS OF THE INVENTION

The present invention provides a color display method and system for a mobile terminal. To make the objectives, technical schemes, and advantages of the present invention more clear and specific, the present invention is described in further detail below with reference to the embodiments in accompaniment with the appending drawings. It should be understood that the specific embodiments described herein are merely for explaining the present invention and the present invention is not limited thereto.

Figure 1:
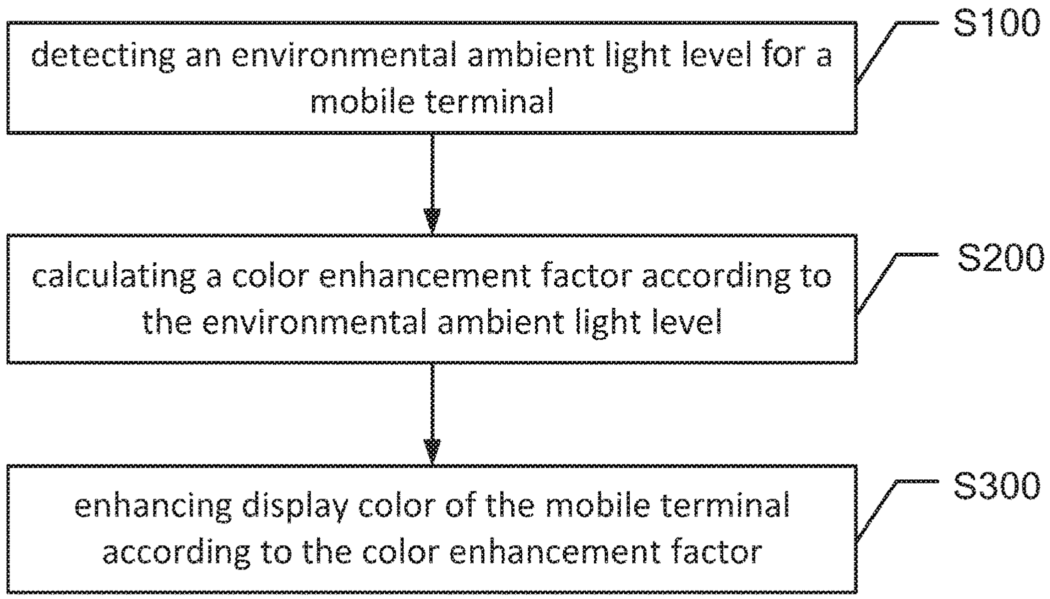
FIG. 1 is a flow chart of a color display method for a mobile terminal in accordance with a preferred embodiment of the present invention.

Please refer to FIG. 1, which is a flow chart of a color display method for a mobile terminal in accordance with a preferred embodiment of the present invention. As shown in FIG. 1, the method includes the following steps.

In Step S100, detecting an environmental ambient light level for a mobile terminal.

In Step S200, calculating a color enhancement factor according to the environmental ambient light level.

In Step S300, enhancing display color of the mobile terminal according to the color enhancement factor.

The above steps are described in further detail below in accompaniment with specific embodiments.

In Step S100, detecting an environmental ambient light level for a mobile terminal. Specifically, a light level sensor may be disposed on the mobile terminal to detect the environmental ambient light level for the mobile terminal. A unit of the light level or illuminance is lumens. Obtaining an environmental ambient light level for the mobile terminal can be carried out in various ways, which are not further detailed herein.

In Step S200, calculating a color enhancement factor according to the environmental ambient light level. Specifically, color enhancement is a technology widely adopted in display panels at present. It can make display colors more colorful, but leads to distortion. Depending on a terminal designer's demand, enhancement factor is usually adjustable. A compromising fixed value is usually chosen for assuring that indoor color distortion and outdoor color distortion are within an acceptable range. However, the present invention combines this factor with the environmental ambient light level. Outdoor ambient light primarily consists of sunlight that is white or approximately white. The ambient light dilutes the display color and makes saturation of a color decrease. The more intensive the ambient light is, the greater the saturation decreases.

In a practical use, the present invention provides the following formulas based on such a principle to dynamically manage the color enhancement factor, thereby alleviating the saturation decrease. Step S200 specifically includes the following steps.

In Step S210, comparing the ambient light level L to a first ambient light level L0, which is preset. The color enhancement factor a is set as a first color enhancement factor a0, which is preset, when L<L0; and the color enhancement factor a is set as Min [a0+(L−L0)/Lmax, 1] when L≥L0, where Lmax is an environmental ambient light level leading to a maximum of color enhancement.

Specifically, a=Min [a0+(L−L0)/Lmax, 1] when L≥L0; and a=a0 when L<L0, where a is a normalized color enhancement factor, a0 is an initial value, and Lmax is defined by an environmental ambient light level leading to a maximum of color enhancement. When indoor ambient light intensity L is equal to L0, a=a0. When the environmental ambient light level exceeds the maximum, this probably means some unexpected strong-light environments, and meanwhile color enhancement is maintained at a maximum without further changes. When L≥L0, take a minimum of a0+(L−L0)/Lmax and 1 as the color enhancement factor a. This is the meaning of Min ( ).

In Step S300, enhancing display color of the mobile terminal according to the color enhancement factor. Specifically, color enhancement is a technology widely adopted in a display panel at present. A compromising fixed value is usually chosen for the color enhancement factor to assure that indoor color distortion and outdoor color distortion are within an acceptable range. The present invention combines the color enhancement factor with the environmental ambient light level, and utilizes the obtained color enhancement factor to enhance a display color of the mobile terminal using an existing color enhancement technology. How to carry out the color enhancement is briefly explained below.

A specific process of color enhancement is illustrated with HSV (Hue, Saturation, Value) space. Other transformed color gamuts can also be processed in a similar fashion. RGB space is transformed into HSV space at first. H parameter represents color information, that is, its position on a spectrum. This parameter is represented using an angular value. Any pair of red, green, and blue are separated by 120 degrees. Complementary colors have a phase of 180 degrees. Saturation S is a ratio ranged from 0 to 1. It represents a ratio of the purity of a picked-up color to a maximum of purity of the color. Only gray level exists when S=0. V parameter represents color brightness, which is ranged from 0 to 1. One thing to keep in mind that it has no direct relation with the light intensity.

The following illustrates with a specific transformation, that is, an algorithm of transformation from RGB to HSV.

```
max=max(R,G,B)
min=min(R,G,B)
if R=max, H=(G−B)/(max−min)
if G=max, H=2+(B−R)/(max−min)
if B=max, H=4+(R−G)/(max−min)
H=H*60
if H<0, H=H+360
V=max(R,G,B)
S=(max−min)/max
```

The color enhancement process is illustrated below.

Process S component of HSV space transformed from RGB space as below.

S'=Min (S*(1+a), 1), where a is a normalized color enhancement factor.

A new S component (S') with an increase in saturation is obtained. The maximum value of S' is 1. S' is still a normalized value.

After that, process in HS'V space and then transform into RGB.

```
if S'=0
R=G=B=V
else
H/=60;
i=INTEGER(H)
f=H−i
a=V*(1−S')
b=V*(1−S'*f)
c=V*(1−S'*(1−f))
switch(i)
case 0: R=V; G=c; B=a;
case 1: R=b; G=v; B=a;
case 2: R=a; G=v; B=c;
case 3: R=a; G=b; B=v;
case 4: R=c; G=a; B=v;
case 5: R=v; G=a; B=b;
```

The color enhancement process is finished.

In order to improve display effect of the display panel, Step S200 may further include the following steps.

In Step S220, detecting whether a maximum color gamut is operating on a display screen of the mobile terminal. If no, a to-be-operated color gamut for the display screen of the mobile terminal is calculated according to the environmental ambient light level and a color gamut mode currently operating on the display screen of the mobile terminal.

Specifically, as to the color gamut mode, a standard mode or a SRGB mode is able to be operated on the display screen. These are common color gamut modes used in the existing skills. For some display screens adopting high color gamut with color management technology, the present invention can introduce the factor of ambient light to carry out management on the basis of it. When the maximum color gamut (its color gamut value is S0, for example) is operating on the display screen, the ambient light will not cause any change of the color gamut and the maximum color gamut with value S0 still maintains unchanged. When a color gamut mode S1 (its color gamut value S1 is less than S0) is operating on the display screen for some reasons (true display or brand-characterized display), the color gamut can be adjusted according to the ambient light. An increase of color gamut means that saturation of a color is enhanced. Likewise, this can alleviate the saturation decrease problem caused by the ambient light.

In a practical use, Step S200 specifically includes the following steps.

In Step S221, calculating a color gamut factor b for the display screen of the mobile terminal according to the environmental ambient light level L when the maximum color gamut is not operating on the display screen of the mobile terminal; the color gamut factor b is set as zero when L<L0; and the color gamut factor b is set as Min [(L−L0)/Lmax, 1] when L≥L0, where L0 is the first environmental ambient light level, and Lmax is an environmental ambient light level leading to a maximum of color enhancement.

In Step S222, using S=S1+b*(S0−S1) to calculate the to-be-operated color gamut S of the display screen of the mobile terminal, where S0 is a color gamut value corresponding to the maximum color gamut operating on the display screen, and S1 is a color gamut value corresponding to the color gamut mode currently operating on the display screen.

Specifically, when L≥L0, take a minimum of (L−L0)/Lmax and 1 as the color gamut factor b. This is the meaning of Min ( ). That is, the to-be-operated color gamut of the display screen of the mobile terminal is calculated according to the environmental ambient light level and the color gamut mode currently operating on the display screen of the mobile terminal, and then the color gamut operating on the display screen is adjusted accordingly, thereby carrying out dynamically adjusting the color gamut of the display screen, alleviating the saturation decrease problem caused by the ambient light, and improving the outdoor display effect.

Step S300 may further comprise Step S310. In Step S310, a color gamut operating on the display screen of the mobile terminal is adjusted according to the obtained to-be-operated color gamut of the display screen of the mobile terminal. Specifically, color gamut adjustment is a digital transformation. According to color gamut conversion theory, if the display effect corresponding to a color gamut S is to be shown on a display screen with a maximum color gamut S0, it needs to transform a digital image from the color gamut to a device-independent color gamut, for example, CIE XYZ space. On the basis of this space, a transformation matrix (for example, H) can be obtained using coordinates of three base colors in the color gamut S0. On this basis, for a specific image in the color gamut S, pre-process it and then transform it to CIE XYZ space. After that, operate it with the transformation matrix H in the high color gamut S0 and then post-process it. The effect corresponding to the color mode S is thus carried out. The specific process is described below. A target color gamut S[R, G, B] is obtained at first. Map it to CIE XYZ space [X, Y, Z] using a pre-process matrix. Then, based on the transformation matrix H, transform it to the original color gamut S0[R', G', B']. Obtain the color gamut S[R, G, B] after post-process. Therefore, the display effect corresponding to the color gamut S can be carried out on a display hardware with the maximum color gamut S0.

The color display method for the mobile terminal provided in the present invention is a self-adaptive image processing method, which can dynamically adjust the color enhancement according to the intensity of ambient light and further adjust spanned color gamut, on the premise that the display effect is assured without significantly increasing power consumption. This can also improve outdoor display effect without affecting the display effect under poor indoor illumination.

Figure 2:
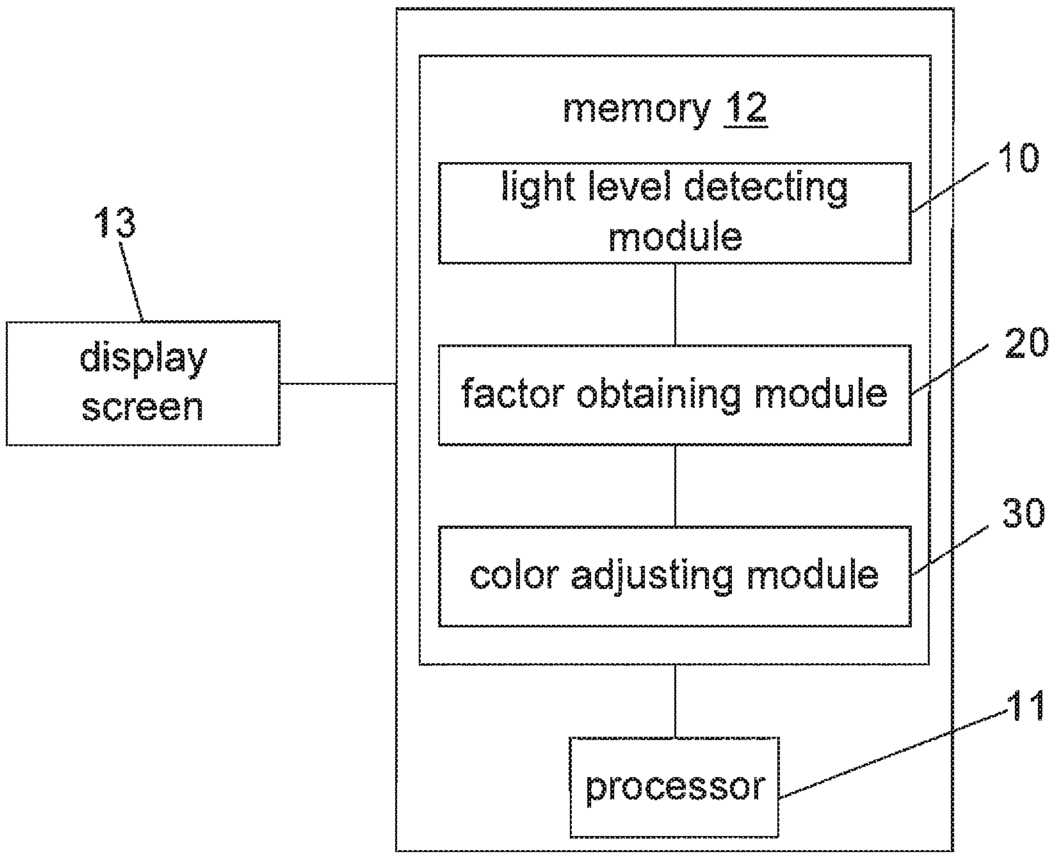
FIG. 2 is a structural diagram showing a color display system for a mobile terminal in accordance with a preferred embodiment of the present invention.

On the basis of the afore-mentioned color display method for the mobile terminal, an embodiment of the present invention further provides a color display system for a mobile terminal, which may comprise a processor 11, a memory 12, and a display screen 13. The memory 12 is used for storing instructions. The processor 11 is coupled to the memory 12, and is used to execute the instructions stored inside the memory 12. All of the modules 10, 20, and 30, and units as introduced below, are instructions executable by the processor 11 to perform corresponding functions. The display screen 13 is configured to display images. As shown in FIG. 2, the color display system includes the following components.

A light level detecting module 10 is configured to detect an environmental ambient light level for a mobile terminal, as specifically described in Step S100.

A factor obtaining module 20 is configured to calculate a color enhancement factor according to the environmental ambient light level, as specifically described in Step S200.

A color adjusting module 30 is configured to enhance display color of the mobile terminal according to the color enhancement factor, as specifically described in Step S300.

Further, the factor obtaining module 20 includes the following components.

A color enhancement factor calculation unit is configured to compare the environmental ambient light level L to a first environmental ambient light level L0, which is preset; set the color enhancement factor a as a first color enhancement factor a0, which is preset, when L<L0; and set the color enhancement factor a as Min [a0+(L−L0)/Lmax, 1] when L≥L0, where Lmax is an environmental ambient light level leading to a maximum of color enhancement.

Further, the factor obtaining module 20 includes the following component.

A color gamut obtaining module is configured to detect whether a maximum color gamut is operating on a display screen of the mobile terminal. If no, a to-be-operated color gamut for the display screen of the mobile terminal is calculated according to the environmental ambient light level and a color gamut mode currently operating on the display screen of the mobile terminal.

Further, the color gamut obtaining unit includes the following components.

A color gamut factor calculation unit is configured to calculate a color gamut factor b for the display screen of the mobile terminal according to the environmental ambient light level L when the maximum color gamut is not operating on the display screen of the mobile terminal; set the color gamut factor b as zero when L<L0; and set the color gamut factor b as Min [(L−L0)/Lmax, 1] when L≥L0, where L0 is the first environmental ambient light level, and Lmax is an environmental ambient light level leading to a maximum of color enhancement; and A color gamut calculation unit is configured to use S=S1+b*(S0−S1) to calculate the to-be-operated color gamut S of the display screen of the mobile terminal, where S0 is a color gamut value corresponding to the maximum color gamut operating on the display screen, and S1 is a color gamut value corresponding to the color gamut mode currently operating on the display screen.

Further, the color adjusting module 30 includes the following component.

A color gamut adjusting unit is configured to adjust a color gamut operating on the display screen of the mobile terminal according to the obtained to-be-operated color gamut of the display screen of the mobile terminal.

Further, the mobile terminal can be implemented by a cell phone, a tablet computer, a smart watch, or a wearable apparatus.

Above all, in the color display method and system for the mobile terminal provided in the present invention, an environmental ambient light for a mobile terminal is detected; a color enhancement factor is calculated according to the environmental ambient light level; and display color of the mobile terminal is enhanced according to the color enhancement factor. A color enhancement technology widely used in a display screen is combined with the environmental ambient light level. The color enhancement is dynamically adjusted according to the intensity of the ambient light. This improves the outdoor display effect on the premise that the display effect is assured without significantly increasing power consumption and the display effect under poor indoor illumination is not affected. Further, the color enhancement and spanned gamut range are dynamically adjusted depending on the intensity of ambient light. The color enhancement factor and color gamut range are adjusted according to the ambient light. This greatly improves outdoor display effect for the display screen of the mobile terminal, improves color performance, and brings a great convenience for the user.

It should be understood that the application of the present invention is not limited to the above-described examples. Those of ordinary skill in the art may make modifications or variations according to the above descriptions, but all such modifications and variations should be within the scope of the appended claims.

What is claimed is:

1. A color display method for a mobile terminal, comprising:

detecting an environmental ambient light level for a mobile terminal;

calculating a color enhancement factor according to a comparison of the environmental ambient light level and a first environmental ambient light level, which is preset;

detecting whether a maximum color gamut is operating on a display screen of the mobile terminal;

calculating a to-be-operated color gamut for the display screen of the mobile terminal according to the environmental ambient light level and a color gamut currently operating on the display screen of the mobile terminal when the maximum color gamut is not operating on the display screen of the mobile terminal;

enhancing display color of the mobile terminal according to the color enhancement factor; and adjusting a color gamut operating on the display screen of the mobile terminal according to the obtained to-be-operated color gamut of the display screen of the mobile terminal, wherein the step of calculating the color enhancement factor according to the comparison of the environmental ambient light level and the first environmental ambient light level comprises:

setting the color enhancement factor as a first color enhancement factor, which is preset, when $L<L0$, where L represents the environmental ambient light level and L0 represents the first environmental ambient light level; and setting the color enhancement factor as Min $[a0+(L-L0)/Lmax, 1]$ when $L\geq L0$, where a0 represents the first color enhancement factor, and Lmax is an environmental ambient light level leading to a maximum of color enhancement.

2. The color display method according to claim 1, wherein the step of calculating the to-be-operated color gamut for the display screen of the mobile terminal according to the environmental ambient light level and the color gamut currently operating on the display screen of the mobile terminal comprises:

calculating a color gamut factor for the display screen of the mobile terminal according to the comparison of the environmental ambient light level and the first environmental ambient light level; and calculating the to-be-operated color gamut of the display screen of the mobile terminal according to the color gamut factor.

3. The color display method according to claim 2, wherein the step of calculating the color gamut factor for the display screen of the mobile terminal according to the comparison of the environmental ambient light level and the first environmental ambient light level comprises:

setting the color gamut factor as zero when $L<L0$, where L represents the environmental ambient light level and L0 represents the first environmental ambient light level; and setting the color gamut factor as Min $[(L-L0)/Lmax, 1]$ when $L\geq L0$, where Lmax is an environmental ambient light level leading to a maximum of color enhancement.

4. The color display method according to claim 2, wherein the step of calculating the to-be-operated color gamut of the display screen of the mobile terminal according to the color gamut factor comprises:

setting the to-be-operated color gamut of the display screen of the mobile terminal as $S1+b*(S0-S1)$, where b represents the color gamut factor, S0 is a color gamut value corresponding to the maximum color gamut operating on the display screen, and S1 is a color gamut value corresponding to the color gamut currently operating on the display screen.

5. A color display method for a mobile terminal, comprising:

detecting an environmental ambient light level for a mobile terminal;

calculating a color enhancement factor according to the environmental ambient light level;

calculating a to-be-operated color gamut for the display screen of the mobile terminal according to the environmental ambient light level and a color gamut currently operating on the display screen of the mobile terminal;

enhancing display color of the mobile terminal according to the color enhancement factor; and adjusting a color gamut operating on the display screen of the mobile terminal according to the obtained to-be-operated color gamut of the display screen of the mobile terminal, wherein the step of calculating the color enhancement factor according to the environmental ambient light level comprises:

comparing the environmental ambient light level to a first environmental ambient light level, which is preset;

setting the color enhancement factor as a first color enhancement factor, which is preset, when $L<L0$, where L represents the environmental ambient light level and L0 represents the first environmental ambient light level; and setting the color enhancement factor as Min [a0+(L-L0)/Lmax, 1] when L≥L0, where a0 represents the first color enhancement factor, and Lmax is an environmental ambient light level leading to a maximum of color enhancement.

6. The color display method according to claim 5, wherein the step of calculating the to-be-operated color gamut for the display screen of the mobile terminal according to the environmental ambient light level and the color gamut currently operating on the display screen of the mobile terminal comprises:

calculating a color gamut factor for the display screen of the mobile terminal according to the environmental ambient light level when the maximum color gamut is not operating on the display screen of the mobile terminal;

setting the color gamut factor as zero when L<L0, where L represents the environmental ambient light level and L0 represents the first environmental ambient light level;

setting the color gamut factor as Min [(L-L0)/Lmax, 1] when L≥L0, where Lmax is an environmental ambient light level leading to a maximum of color enhancement; and using S=S1+b*(S0-S1) to calculate the to-be-operated color gamut of the display screen of the mobile terminal, where S represent the to-be-operated color gamut, b is the color gamut factor, S0 is a color gamut value corresponding to the maximum color gamut operating on the display screen, and S1 is a color gamut value corresponding to the color gamut currently operating on the display screen.

7. A color display system for a mobile terminal, comprising:

a processor; and a memory connected with processor, the memory comprising a plurality of program instructions executable by the processor, the plurality of program instructions comprising:

a light level detecting module configured to detect an environmental ambient light level for a mobile terminal;

a factor obtaining module configured to calculate a color enhancement factor according to the environmental ambient light level; and a color adjusting module configured to enhance display color of the mobile terminal according to the color enhancement factor, the factor obtaining module comprising:

a color gamut obtaining unit configured to calculate a to-be-operated color gamut for the display screen of the mobile terminal according to the environmental ambient light level and a color gamut currently operating on the display screen of the mobile terminal; and a color gamut adjusting unit configured to adjust a color gamut operating on the display screen of the mobile terminal according to the obtained to-be-operated color gamut of the display screen of the mobile terminal, wherein the factor obtaining module comprises:

a color enhancement factor calculation unit configured to compare the environmental ambient light level to a first environmental ambient light level, which is preset; set the color enhancement factor as a first color enhancement factor, which is preset, when L<L0, where L represents the environmental ambient light level and L0 represents the first environmental ambient light level; and set the color enhancement factor (a) as Min [a0+(L-L0)/Lmax, 1] when L≥L0, where a0 represents the first color enhancement factor, and Lmax is an environmental ambient light level leading to a maximum of color enhancement.

8. The color display system according to claim 7, wherein the color gamut obtaining unit comprises:

a color gamut factor calculation unit configured to calculate a color gamut factor for the display screen of the mobile terminal according to the environmental ambient light level when the maximum color gamut is not operating on the display screen of the mobile terminal; set the color gamut factor as zero when L<L0, where L represents the environmental ambient light level and L0 represents the first environmental ambient light level; and set the color gamut factor as Min [(L-L0)/Lmax, 1] when L≥L0, where Lmax is an environmental ambient light level leading to a maximum of color enhancement; and a color gamut calculation unit configured to use S=S1+b*(S0-S1) to calculate the to-be-operated color gamut of the display screen of the mobile terminal, where S represent the to-be-operated color gamut, b is the color gamut factor, S0 is a color gamut value corresponding to the maximum color gamut operating on the display screen, and S1 is a color gamut value corresponding to the color gamut currently operating on the display screen.

* * * * *